United States Patent
Oswald et al.

(10) Patent No.: US 6,545,094 B2
(45) Date of Patent: Apr. 8, 2003

(54) BLENDS OF ETHYLENIC POLYMERS WITH IMPROVED MODULUS AND MELT STRENGTH AND ARTICLES FABRICATED FROM THESE BLENDS

(75) Inventors: Thomas Oswald, Lake Jackson, TX (US); Bharat I. Chaudhary, Pearland, TX (US); Jeffrey D. Weinhold, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/927,908

(22) Filed: Aug. 9, 2001

(65) Prior Publication Data

US 2003/0032731 A1 Feb. 13, 2003

Related U.S. Application Data

(60) Provisional application No. 60/274,789, filed on Mar. 9, 2001.

(51) Int. Cl.$^7$ .......................... C08L 33/02; C08L 33/04; C08L 35/02
(52) U.S. Cl. ...................... 525/191; 525/221; 525/222; 525/240
(58) Field of Search ................. 525/191, 221, 525/222, 240

(56) References Cited

U.S. PATENT DOCUMENTS

| | | | |
|---|---|---|---|
| 3,573,152 A | 3/1971 | Wiley et al. | |
| 3,616,365 A | 10/1971 | Stastny et al. | |
| 3,644,230 A | 2/1972 | Cronin | |
| 3,645,992 A | 2/1972 | Elston et al. | |
| 4,168,353 A | 9/1979 | Kitamori | 521/59 |
| 4,214,054 A | 7/1980 | Watanabe et al. | 521/95 |
| 4,226,946 A | 10/1980 | Tanaka et al. | 526/114 |
| 4,323,528 A | 4/1982 | Collins | 264/53 |
| 4,379,859 A | 4/1983 | Hirosawa et al. | 521/59 |
| 4,429,059 A | 1/1984 | Ozutsumi et al. | 521/60 |
| 4,464,484 A | 8/1984 | Yoshimura et al. | 521/58 |
| 4,599,392 A | 7/1986 | McKinney et al. | 526/318.6 |
| 4,649,001 A | 3/1987 | Nakamura et al. | 264/50 |
| 4,798,081 A | 1/1989 | Hazlitt et al. | 73/53 |
| 4,824,720 A | 4/1989 | Malone | 428/294 |
| 5,008,204 A | 4/1991 | Stehling | 436/85 |
| 5,272,236 A | 12/1993 | Lai et al. | 526/348.5 |
| 5,278,272 A | 1/1994 | Lai et al. | 526/348.5 |
| 5,424,016 A | 6/1995 | Kolosowski | 264/156 |
| 5,582,923 A | 12/1996 | Kale et al. | 428/523 |
| 5,585,058 A | 12/1996 | Kolosowski | 264/156 |
| 5,792,534 A * | 8/1998 | deGroot et al. | 428/36.92 |
| 5,817,705 A | 10/1998 | Wilkes et al. | 521/79 |
| 5,863,665 A | 1/1999 | Kale et al. | 428/523 |
| 5,869,591 A | 2/1999 | McKay et al. | 526/347 |
| 5,977,271 A | 11/1999 | McKay et al. | 526/170 |
| 6,124,370 A | 9/2000 | Walton et al. | 521/143 |
| 6,270,891 B1 * | 8/2001 | Maugans et al. | 428/364 |

FOREIGN PATENT DOCUMENTS

WO 93/04486 3/1993

OTHER PUBLICATIONS

Ghijsels et al., "Melt Strength Behavior of Polyethylene Blends", Intern. Polymer Proceesing VII, (1992) pp. 44–50.
Wild et al., Journal of Polymer Science, Poly. Phys. Ed., vol. 20, p. 441 (1982).

* cited by examiner

Primary Examiner—Nathan M. Nutter

(57) ABSTRACT

A blend which comprises;
A) a heterogeneous or homogenous linear ethylene homopolymer or interpolymer;
B) a branched homopolymer or interpolymer;
wherein said blend has;
1) a melt index, I2, of about 0.05 to about 20 g/10 min;
2) a flexural modulus of $\geq$100,000 psi or $\leq$30,000 psi;
3) a melt strength of $\geq$2 cN;
4) a melt extensibility of $\geq$25 mm/sec; and
5) wherein said melt strength of said blend meets the following relationship;

Melt strength$\geq F_{MS}*[(f*A)+((1-f)*B)]$; where:

$A = 3.3814*(I2)^{-0.6476}$ and $B = 16.882*(I2)^{-0.6564}$; where

I2 is the measured melt index of the blend; f is the weight fraction of the linear polyethylene in the blend and $F_{MS}$ is $\geq$1.1. Also included in the present invention are foams, films, fibers, blow molded articles, wire and cable articles and extrusion coatings comprising said blend.

4 Claims, No Drawings

BLENDS OF ETHYLENIC POLYMERS WITH IMPROVED MODULUS AND MELT STRENGTH AND ARTICLES FABRICATED FROM THESE BLENDS

CROSS-REFERENCE TO RELATED APPLICATIONS

This application claims the benefit of U.S. Provisional Application No. 60/274,789, filed Mar. 9, 2001, the entire contents of which are herein incorporated by reference.

STATEMENT REGARDING FEDERALLY SPONSORED RESEARCH OR DEVELOPMENT

Not Applicable

FIELD OF THE INVENTION

This invention describes resin formulations having a flexural modulus of greater than or equal to 100,000 psi or less than or equal to 30,000 psi, which also yield previously inaccessible high melt strengths at a given melt index. This invention also provides fabricated articles including foams made from these resin formulations.

BACKGROUND OF THE INVENTION

Blends of low density polyethylene (LDPE) and linear low density polyethylene (LLDPE) are known in the prior art. For example, Ghijsels et al., in "Melt Strength Behavior of Polyethylene Blends", Intern. Polymer Processing VII (1992), p. 44–50, exemplifies blends of LDPE and LLDPE, where the LLDPE has a melt index (I2) of 0.1 g/10 min and the final blend densities are approximately 0.92 g/cm$^3$, and which show a synergistic improvement in melt strength. A polyethylene resin density of 0.92 g/cc corresponds approximately to a flexural modulus of 40,000 psi. However, Ghijsels neither exemplifies nor gives any indication of the range of the ethylenic blend components in which synergy would be observed for blends having a flexural modulus greater than or equal to 100,000 psi, nor less than or equal to 30,000 psi.

U.S. Pat. Nos. 5,863,665 and 5,582,923 describe an ethylene polymer extrusion composition comprising from about 75 to 95 percent of at least one ethylene/α-olefin interpolymer composition selected from the group consisting of a substantially linear ethylene polymer composition, a homogeneously branched linear 5 ethylene polymer composition and a heterogeneously branched linear ethylene polymer composition, (wherein the ethylene/α-olefin polymer is characterized as having a density in the range of 0.85 g/cc to 0.940 g/cc) and from about 5 to 25 percent of at least one high pressure ethylene polymer characterized as having a melt index, I2, of less than 6.0 g/10 minutes, a density of at least 0.916 g/cc, a melt strength of at least 9 cN as determined using a Gottfert Rheotens unit at 190° C., a Mw/Mn ratio of at least 7.0 and a bimodal molecular weight distribution as determined by gel permeation chromatography, wherein the ethylene polymer extrusion composition has a melt index, I2, of at least 1.0 g/10 minutes. The blends of this composition would have flexural modulus less than about 115,000 psi. In contrast, the blends of the present invention would have flexural modulus ≧120,000 psi at comparable melt strength. Furthermore, this patent does not teach, exemplify or claim foams.

U.S. Pat. No. 4,649,001 describes a process for producing a polyethylene extruded foam, which comprises melting and kneading a composition of a polyethylene-based resin containing a foaming agent followed by extrusion-foaming. A linear low-density polyethylene having a broad molecular weight distribution is used as the polyethylene-based resin. The linear low-density polyethylene used has a density of 0.920 to 0.940 g/cm$^3$; a melt flow rate of 0.3 to 10 g/10 min and a relationship between a weight average molecular weight and a number average molecular weight (Mw/Mn) greater than or equal to 4. Low density polyethylene of 0.918 to 0.923 g/cm$^3$ density may also be blended to make foams. The foams were all extruded. Cross-linked foams were not claimed. The highest flexural modulus of the resins used to make the extruded foams would correspond to about 120,000 psi (at a resin density of 0.940 g/cm$^3$), but this would not be a blend. Furthermore, the density of the linear low-density polyethylene was 0.940 g/cm$^3$ or less.

U.S. Pat. No. 4,226,946 discloses polyethylene blend foams having density from about 3.0 to about 15.0 pounds per cubic foot, substantially closed-cell structure and average compressive strength at 10 percent deformation of from about 7 to about 170 psi, preferably about 7 to about 60 psi, and an improved method and a means for making the same from polyethylene blends and at least one blowing agent using gel-forming extrusion technology. The polyethylene blend comprises from about 35 to about 60 weight percent of low density branched polyethylene (0.910 to 0.930 g/cc density) in admixture with from about 40 to about 65 weight percent of intermediate density linear polyethylene (0.931 to 0.940 g/cc density). The densities of the resulting blends would be less than 0.9365 g/cc (corresponding to a flexural modulus less than about 100,000 psi) and greater than 0.9180 g/cc (corresponding to a flexural modulus greater than about 40,000 psi).

However, there is still a need for resin compositions which, while achieving a required flexural modulus ≧100,000 psi or ≦30,000 psi, can also exhibit high melt strength and/or melt extensibility, at a given melt index. We have surprisingly found that certain compositions exhibit synergistic improvements in melt strength and, in some cases, even more surprisingly, in melt extensibility at this melt strength. Branched resins can't achieve the modulus possible with linear polyethylene resins, and linear resins would have to have much lower melt index than branched resins of comparable melt strength. Furthermore, the melt strength achieved with the blends used in the present invention may exceed, at a given melt index, the melt strength achievable with any branched resin or linear resin at the same melt index and/or density. Consequently, the blends used in the present invention exhibit greatly improved melt strength compared with a linear polyethylene resin of the same density.

The extrusion foam manufacturing process requires a resin of sufficiently high melt strength to allow the bubble structure to maintain its integrity during the expansion process immediately after extrusion from the die. Prior to this invention, the only resins capable of meeting this requirement at the melt index suitable for processing (I2>0.5, preferably >1 g/10min) were branched resins such as LDPE, EVA and the like. Hence, the flexural modulus was limited to that obtainable with these branched resins (i.e. about 80,000 psi or less, equivalent to an LDPE of density less than or equal to approximately 0.930 g/cm$^3$). It would be highly desirable to produce a foam using resin of higher modulus (>100,000 psi), as this allows the overall density of the foam to be reduced, while maintaining the compressive strength of higher density foam made from a branched resin (although this resin has the limitation of lower modulus).

The present invention describes blends comprising branched resins (eg LDPE) and linear resins (eg LLDPE prepared by for example Ziegler and/or metallocene catalysts). These blends provide a unique combination of increased melt strength and modulus at a given melt index, I2. Optionally, specific blend formulations may also be selected to provide modulus both higher or lower than that achievable with LDPE alone. Thus this invention can provide blends of flexural modulus greater than or equal to 100,000 psi or less than 30,000 psi, at melt strengths similar to or greater than those associated with LDPE or linear polyethylene having similar melt index, I2.

The blends of the present invention are useful for fabricating high modulus foams, the preparation of which requires high melt strength. The resulting high modulus compositions (i.e., greater than 100,000 psi flexural modulus) are particularly suitable for manufacture of crosslinked and noncrosslinked foams. Thus the foams of the present invention have compressive strength and load bearing capacity similar to that of foams made from branched polyethylenes, but the inventive foams have significantly lower foam density (allowing a significant reduction in the amount of resin, by weight, necessary to produce such foams). In addition, the upper service temperature of the foams of this invention may also be improved, resulting in subsequent improvement in foam dimensional stability. No resin with this combination of properties is currently available.

The high modulus foams of the present invention comprise blends of high melt strength branched resin of relatively low modulus, with linear resin of higher density and therefore higher modulus, to yield a final blended resin of modulus greater than 100,000 psi. Commercially available branched ethylenic resins cannot achieve this modulus.

Also included in the present invention are so called "soft" foams. These foams comprise blends of high melt strength branched resin of relatively low modulus, with linear resin of lower density and therefore lower modulus, to yield a final blended resin of flexural modulus less than or equal to 30,000 psi. Commercially available low density polyethylene cannot achieve this modulus either. Ethylenic copolymers such as ethylene vinyl acetate (EVA) and ethylene acrylic acid (EAA) can have flexural modulus less than 30,000 psi, but these resins are not thermally stable at high temperatures (i.e., degrade readily) and often result in significant discolouration and/or smell. Thus, these resins only have limited utility for extruded, non-crosslinked foams.

BRIEF SUMMARY OF THE INVENTION

A blend which comprises;
A) a heterogeneous or homogenous linear ethylene homopolymer or interpolymer;
B) a branched homopolymer or interpolymer;
   wherein said blend has;
   1) a melt index, I2, of about 0.05 to about 20 g/10 min;
   2) a flexural modulus of $\geq$100,000 psi or $\leq$30,000 psi;
   3) a melt strength of $\geq$2 cN;
   4) a melt extensibility of $\geq$25 mm/sec; and
   5) wherein said melt strength of said blend meets the following relationship;

Melt strength$\geq F_{MS}*[(f*A)+((1-f)*B)]$; where:

$A=3.3814*(I2)^{-0.6476}$ and $B=16.882*(I2)^{-0.6564}$; where

I2 is the measured melt index of the blend; f is the weight fraction of the linear polyethylene in the blend and $F_{MS}$ is $\geq 1.1$.

DETAILED DESCRIPTION OF THE INVENTION

Definitions

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from I to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "hydrocarbyl" as employed herein means any aliphatic, cycloaliphatic, aromatic, aryl substituted aliphatic, aryl substituted cycloaliphatic, aliphatic substituted aromatic, or aliphatic substituted cycloaliphatic groups.

The term "hydrocarbyloxy" means a hydrocarbyl group having an oxygen linkage between it and the carbon atom to which it is attached.

The term "interpolymer" is used herein to indicate a polymer wherein at least two different monomers are polymerized to make the interpolymer. This includes copolymers, terpolymers, etc.

The term "soft foam" is used herein to indicate a foam which has an Asker C hardness less than about 30, preferably less than about 25 and most preferably less than about 20. The hardness of the present foams was measured using an Asker C durometer for cellular rubber and yarn in accordance with ASTM D2240-97 (but with a spherical indentor of about 5 mm diameter).

Melt Index (I2, g/10 min) was determined by ASTM D-1238 (190° C./2.16 kg).

Density (g/cm$^3$) was determined by ASTM D-792.

Flexural Modulus was measured in accordance with ASTM D-790–91, Method 1, Procedure B. A bar of rectangular cross-section was tested using a three-point loading system and a 10 pound load cell.

Melt Tension—The melt tension (in grams) was measured at 190° C. using a 2.16 kg load and pulling strands of molten polymers at 50 rpm around a pulley system for a haul-off rate over a thirty second period. The melt tension was the average force over this period.

Melt Strength (MS, measured in cN) and Melt Extensibility (ME, measured in mm/s)—The measurements were conducted by pulling strands of the molten polymers or blends at constant acceleration until breakage occurred. The experimental set-up consisted of a capillary rheometer and a Rheotens apparatus as take-up device. The force required to uniaxially extend the strands was recorded as a function of the take-up velocity. The maximum force attained before either draw resonance or breakage occurred was defined as the melt strength. The velocity at which draw resonance or breakage occurred was defined as the melt extensibility.

Draw resonance, which terminated in breakage, was indicated by the onset of a periodic oscillation of increasing amplitude in the measured force profile. In the absence of any observable draw resonance, the melt strength was defined as the force at break. These tests were run under the following conditions:

Mass flow rate: 1.35 gram/min
Temperature: 190° C.
Capillary length: 41.9 mm
Capillary diameter: 2.1 mm
Piston diameter: 9.54 mm
Piston velocity: 0.423 mm/s
Shear rate: 33.0 $s^{-1}$
Draw-down distance (die exit to take-up wheels): 100 mm
Cooling conditions: ambient air
Acceleration: 2.4 $mm/s^2$ Upper Service Temperature (UST)—A thermomechanical analyzer (TMA) commercially available from Perkin Elmer Corporation under the trade designation model TMA 7 was used to measure the upper service temperature (UST) of the polymers and blends. Probe force of 102 g and heating rate of 5° C./min were used. Each test specimen was a disk with thickness of 3.3 mm and 7.8 mm diameter, prepared by compression molding at 205° C. and air-cooling to room temperature. The temperature at the probe penetration of 1 mm was taken as the upper service temperature (UST).

The Blend Compositions.

The blend compositions of the present invention comprise one or more linear homopolymers or interpolymers (Component A) and one or more branched homopolymers or interpolymers (Component B).

Component A The linear homopolymers and interpolymers comprising Component A, are those prepared using so called coordination catalysis including Ziegler and metallocene type catalyst systems. The linear interpolymers can be further divided into homogeneous or heterogeneous polymers, depending upon how the comonomer is distributed within the interpolymer molecules.

The linear homogeneous polymers and interpolymers used as Component A in the blends of the present invention are herein defined as defined in U.S. Pat. No. 39645,992 (Elston), the disclosure of which is incorporated herein by reference. Accordingly, homogeneous polymers and interpolymers are those in which the comonomer is randomly distributed within a given interpolymer molecule and wherein substantially all of the interpolymer molecules have the same ethylene/comonomer ratio within that interpolymer. The homogeneous polymers have a narrow composition distribution.

The term "narrow composition distribution" used herein describes the comonomer distribution for homogeneous interpolymers and means that the homogeneous interpolymers have only a single melting peak and essentially lack a measurable "linear" polymer fraction. The narrow composition distribution homogeneous interpolymers can also be characterized by their SCBDI (short chain branch distribution index) or CDBI (composition distribution branch index). The SCBDI or CDBI is defined as the weight percent of the polymer molecules having a comonomer content within 50 percent of the median total molar comonomer content.

The CDBI of a polymer is readily calculated from data obtained from techniques known in the art, such as, for example, temperature rising elution fractionation (abbreviated herein as "TREF") as described, for example, in Wild et al, *Journal Of Polymer Science, Poly. Phys. Ed.*, Vol. 20, p. 441 (1982), or in U.S. Pat. No. 4,798,081, and U.S. Pat. No. 5,008,204 and WO 93/04486, the disclosures of all of which are incorporated herein by reference. The SCBDI or CDBI for the narrow composition distribution homogeneous interpolymers and copolymers of the present invention is preferably greater than about 30 percent, especially greater than about 50 percent. The narrow composition distribution homogeneous interpolymers and copolymers used in this invention essentially lack a measurable "high density" (i.e., homopolymer) fraction as measured by the TREF technique. The linear homogeneous interpolymers and polymers also have a degree of branching less than or equal to 2 methyls/1000 carbons in about 15 percent (by weight) or less, preferably less than about 10 percent (by weight), and especially less than about 5 percent (by weight).

Useful linear homogeneous homopolymers or interpolymers also include the so-called substantially linear polymers defined as in U.S. Patent No. 5,272,236 (Lai et al.), and in U.S. Pat. No. 5,278,272, the entire contents of which are incorporated by reference.

Linear heterogeneous homopolymers and interpolymers can also be used as Component A in the blends of the present invention. Heterogeneous interpolymers are those in which substantially all of the interpolymer molecules do not have the same ethylene/comonomer ratio and have a broad composition distribution.

The term "broad composition distribution" used herein describes the comonomer distribution for heterogeneous interpolymers and means that the heterogeneous interpolymers have a "linear" fraction and that the heterogeneous interpolymers have multiple melting peaks (i.e., exhibit at least two distinct melting peaks). The linear heterogeneous interpolymers and polymers also have a degree of branching less than or equal to 2 methyls/1000 carbons in about 10 percent (by weight) or more, preferably more than about 15 percent (by weight), and especially more than about 20 percent (by weight). The heterogeneous interpolymers also have a degree of branching equal to or greater than 25 methyls/1000 carbons in about 25 percent or less (by weight), preferably less than about 15 percent (by weight), and especially less than about 10 percent (by weight) of the total polymer.

The linear homogeneous and heterogeneous polymers and interpolymers used to make the novel polymer compositions used in the present invention can be ethylene homopolymers or interpolymers of ethylene with at least one $C_3$–$C_{20}$ α-olefin. Preferred monomers include ethylene, 1-propene, 1-butene, 1-hexene, 4-methyl-1-pentene, and 1-octene. Other preferred monomers include styrene, halo- or alkyl substituted styrenes, vinylbenzocyclobutane, 1,4-hexadiene, cyclopentene, cyclohexene and cyclooctene.

Component B

The branched polymers and interpolymers used as Component B in the blends of the present invention are defined herein as those that are partly or entirely homopolymerized or interpolymerized in autoclave or tubular reactors at pressures above 14,500 psi (100 MPa) with the use of free-radical initiators.

Such branched polymers and interpolymers, include, but are not limited to, low density ethylene polymers such as high pressure low density ethylene homopolymer (LPDE), ethylene-vinyl acetate copolymer (EVA), ethylene-acrylic acid copolymer (EAA), ethylene-carboxylic acid copolymers and ethylene acrylate copolymers as well as olefin polymers produced at low to medium pressures such as polybutylene (PB).

Suitable high pressure ethylene interpolymers include ethylene interpolymerized with at least one, α,β-ethylenically unsaturated comonomers (for example, acrylic acid, methacrylic acid and vinyl acetate) as described by McKinney et al. in U.S. Pat. No. 4,599,392. Preferred high pressure ethylene interpolymers comprise from 0.1 to 55 total weight percent comonomer, and more preferably from 1 to 35 total weight percent comonomer, and most preferably from 2 to 28 total weight percent comonomer, and can be chemically and/or physically modified by any known technique such as, for example, by ionomerization and extrusion grafting.

Properties of the Blend Compositions of the Present Invention.

The blends of the present invention may be prepared by any suitable means known in the art such as, for example, dry blending in a pelletized form in desired proportions followed by melt blending in an apparatus such as a screw extruder or a Banbury mixer. Dry blended pellets may be directly melt processed into a final solid state article by, for example, extrusion or injection molding. The blends may also be made by direct polymerization without isolating blend components. Direct polymerization may use, for example, one or more catalysts in a single reactor or two or more reactors in series or parallel and vary at least one of operating conditions, monomer mixtures and catalyst choice. Blending the branched and linear resins at melt temperatures greater than 230° C. may lead to a further increase in melt strength.

We have found, unexpectedly, that by blending certain branched polyethylene resins with higher density linear polyethylene resins, we obtain a resin blend of a certain melt index range with the necessary melt strength to permit foam production. This melt strength is synergistically much higher than that expected from a linear combination of the two components.

The melt strength of the blend meets the following relationship;

Melt strength $\geq F_{MS}*[(f*A)+((1-f)*B)]$ where:

$A=3.3814*(I2)^{-0.6476}$ and $B=16.882*(I2)^{-0.6564}$

Where I2 is the measured melt index of the blend; f is the weight fraction of the linear polyethylene (Component A) in the blend.

$F_{MS}$ is a measure of synergy in melt strength in a blend. When $F_{MS}=1.0$, the blend exhibits no synergistic improvement in melt strength with respect to the melt index of the blend. It is often observed that the blend melt index is unexpectedly low, which in itself leads to unexpectedly high melt strength. Thus the definition of synergy herein is very conservative and Fms>1 always indicates a substantial level of synergy and unexpectedly high melt strength. When $F_{MS} \geq 1$, the blend is synergistic in that it shows greater melt strength than expected (or predicted) from a combination of linear and branched ethylenic polymers at the melt index of the blend.

For the blends of the present invention, $F_{MS}$ is $\geq 1.1$, preferably $\geq 1.25$, more preferably $\geq 1.5$, even more preferably $\geq 2.0$, most preferably $\geq 2.5$.

The final melt index, $I_2$, of the blend composition is from about 0.05 to about 20, preferably from about 0.1 to about 10, more preferably from about 0.2 to about 7, even more preferably 0.5 to 5 g/10 min.

The final melt strength of the blend composition is greater than or equal to 2 cN, more preferably greater than or equal to 7 cN, most preferably greater than or equal to 10 cN.

The final melt extensibility of the blend composition is greater than or equal to 25, preferably greater than or equal to 50, most preferably greater than or equal to 75 mm/sec.

The final flexural modulus of the blend composition is greater than or equal to 100,000 psi, more preferably greater than or equal to 120,000 psi and, most preferably greater than or equal to 130,000 psi.

In another embodiment, the final flexural modulus of the blend composition is less than or equal to 30,000 psi, preferably less than or equal to 25,000 psi and most preferably less than or equal to 20,000 psi.

For the blends with flexural modulus greater than or equal to 100,000 psi, the upper service temperature (UST) of the blends will be greater than about 115° C., preferably greater than about 118° C., more preferably greater than about 121° C. and even more preferably greater than about 125° C.

The melt index, I2, of Component A, is less than about 60 g/10 min, preferably less than about 30 g/10 min, more preferably less than about 15 g/10 min and most preferably less than about 10 g/10 min.

Suitable branched ethylenic polymers, Component B, include EVA, LDPE and EAA of melt index of 0.05–10 g/10 min. It is most preferable to use LDPE. For the blends with flexural modulus greater than or equal to 100,000 psi, Component A, should have a modulus greater than about 138,000 psi, preferably greater than about 164,000 psi, and more preferably greater than about 210,000 psi. It is most preferred that Component A be an ethylene homopolymer.

For the blends with flexural modulus less than or equal to 30,000 psi, Component A should have a modulus less than about 28,000 psi, preferably less than about 25,000 psi, more preferably less than about 22,000 psi.

The blends of the present invention may optionally comprise "additional polymers" including one or more other thermoplastics to provide additional improvements in properties including but not limited to processability, upper service temperature, modulus, compressive strength, hardness, toughness, increased foam cell size, and aesthetics of the final foams or articles fabricated therefrom. Examples of the "additional polymers" include, but are not limited to, low density polyethylene (LDPE), high density polyethylene (HDPE), linear low density polyethylene (LLDPE), ethylene styrene interpolymers (ESI), polypropylene (PP), polystyrene (PS), ethylene-propylene rubber and styrene-butadiene rubber. In one embodiment, the blends of the present invention may be further blended with alkenyl aromatic polymers (such as polystyrene) to make, for example, alkenyl aromatic polymer foams with increased cell size.

Applications of these blends include those in which melt strength, modulus and/or upper service temperature are key performance requirements, for example, non-crosslinked foams for cushion packaging, sports and leisure, building and construction, etc; non-crosslinked blowmolded articles; crosslinked foams for applications such as automotive; non-crosslinked foam bottle labels; films; fibers; wire and cable; and extrusion coatings.

The Foams of the Present Invention.

The present invention provides blends with flexural modulus above about 100,000 psi simultaneously with high melt strength and high melt extensibility at comparatively higher melt indices, therefore broadening the applicability of high modulus resins into foam structures and processes not previously attainable or viable with traditional linear or substantially linear polyethylene. It is not possible to achieve these MS, ME and MI combinations using linear polymers of flexural modulus of 100,000 psi or more. With a branched ethylenic polymer, it is possible to achieve the MS and ME but the flexural modulus will be 80,000 psi or less.

The present invention also provides blends with flexural modulus less than about 30,000 psi simultaneously with high melt strength and high melt extensibility at comparatively higher melt indices, therefore broadening the applicability of low modulus resins into foam structures and processes not previously attainable or viable with traditional linear polyethylene. It is not possible to achieve these melt strength, high melt extensibility and melt index combinations using linear polymers of flexural modulus of 30,000 psi or less. With a branched ethylenic polymer other than EVA, it is not possible to achieve the MS and ME and the flexural modulus will be greater than 30,000 psi. In the case of EVA such benefits only come with unacceptable additional properties such thermal instability, and odor.

The flexural modulus of these blends is higher than previously described in the prior art, giving greater stiffness and therefore greater compressive strength than existing compositions, yet with the required melt strength and melt extensibility to allow satisfactory fabrication into foams. The reduced amount of resin required in these foams results in economic and environmental advantages over current technology. At any given melt index, no previously described polyethylene provides the combination of melt strength, extensibility and modulus above about 100,000 psi as described in this invention.

To prepare commercially acceptable foams of any modulus, one needs to have a minimum melt strength of about 2 cN, preferably greater than about 7 cN and most preferably greater than 10 cN, and a minimum extensibility of about 25 mm/sec, preferably greater than about 50 mm/s and most preferably greater than about 75 mm/s. LDPE resins exhibit these properties but cannot yield the required modulus (greater than about 100,000 psi or alternatively less than 30,000 psi) or stiffness. HDPE or LLDPE resins can only achieve the required melt strength at a melt index (I2)<3 g/10 min, often <1 g/10 min. This causes difficulties in foam processability, for instance, due to excessive shear heating.

This very high melt strength is a necessary requirement for successful foam production and is greater than that required of branched resins such as LDPE, and is not attainable at the same melt index and density with previously known branched polyethylenes. This is particularly true for the high modulus foams of the present invention, a result of the higher foaming temperature necessary due to the increased melting point of the higher density resin, and the increased amount of blowing agent required to create the lower density foam product, both of which tend to reduce the viscosity of the extrudate. Without the high melt strength, the foam would collapse due to collapse of the foam cell structure prior to solidification.

The foams will comprise 0.05 to 100, preferably 0.1 to 100 and most preferably 0.2 to 100 weight percent of the blend of Components A and B (based on total amount of polymers present in the foam).

The polymer compositions described above may be converted to foam products using physical and/or chemical blowing agents and any conventional process. Foam products include, for example, extruded thermoplastic polymer foam, extruded polymer strand foam, expandable thermoplastic foam beads, expanded thermoplastic foam beads or expanded and fused thermoplastic foam beads, and various types of crosslinked foams. The foam products may take any known physical configuration, such as sheet, round, strand geometry, rod, film, solid plank, laminated plank, coalesced strand plank, profiles and bun stock. The foam products may be converted into fabricated articles using any conventional process or method. For example, any one or more of expansion, coalescing and welding may be used in making such articles, especially from expandable foam beads. One may also mold expandable beads into any known configuration that employs foam products, including, but not limited to the foregoing configurations.

Foam forming steps of the process are known in the art. For instance as exemplified by the teachings to processes for making ethylenic polymer foam structures and processing them in C. P. Park. "Polyolefin Foam", Chapter 9, Handbook of Polymer Foams and Technology, edited by D. Klempner and K. C. Frisch, Hanser Publishers, Munich, Vienna, New York, Barcelona (1991), which is incorporated here in by reference.

Foams of the present invention may be substantially noncrosslinked. That is, the foam structure contains 50 or less, preferably 40 or less, more preferably 30 or less, even more preferably 20 or less, most preferably 10 or less weight percent gel based upon the total weight of foam or polymer, as measured according to ASTM D-2765-84, Method A.

Alternatively, the polymer compositions could be used to make foams which are substantially cross-linked (that is, contain greater than 50 weight percent gel based upon the total weight of foam or polymer, as measured according to ASTM D-2765-84 Method A) by further addition of any known cross-linking agent. The various crosslinking agents and technologies are described in the art. Cross-linking may be induced by addition of a cross-linking agent. Induction of cross-linking and exposure to an elevated temperature to effect foaming or expansion may occur simultaneously or sequentially. If a chemical cross-linking agent is used, it is incorporated into the polymer material in the same manner as the chemical blowing agent. Further, if a chemical cross-linking agent is used, the foamable melt polymer material is heated or exposed to a temperature of preferably less than 150° C. to prevent decomposition of the cross-linking agent or the blowing agent and to prevent premature cross-linking. If radiation cross-linking is used, the foamable melt polymer material is heated or exposed to a temperature of preferably less than 160° C. to prevent decomposition of the blowing agent. The foamable melt polymer material is extruded or conveyed through a die of desired shape to form a foamable structure. The foamable structure is then cross-linked and expanded at an elevated or high temperature (typically, 150° C.–250° C.) such as in an oven to form a foam structure. If radiation cross-linking is used, the foamable structure is irradiated to cross-link the polymer material, which is then expanded at the elevated temperature as described above. The present structure can advantageously be made in sheet or thin plank form according to the above process using either cross-linking agents or radiation.

The term "cross-linking agent" as used herein means a compound or mixture of compounds used for the purposes of substantially crosslinking a polymer or polymer blend. The cross-linking agent used to prepare the foams and articles of the present invention include, but are not limited to peroxides, silanes, radiation, azides, phenols, aldehyde-amine reaction products, substituted ureas, substituted guanidines, substituted xanthates, substituted dithiocarbamates, sulfur-containing compounds, thiazoles, imidazoles, sulfenamides, thiuramidisulfides, paraquinonedioxime, dibenzoparaquinonedioxime, sulfur; and combinations thereof.

The various crosslinking technologies are described in U.S. Pat. No's. 5,869,591 and 5,977,271, the entire contents of both of which are herein incorporated by reference. Dual cure systems, which use a combination of heat, moisture cure, and radiation steps, may be effectively employed. Dual cure systems are disclosed and claimed in U.S. Pat. No. 6,124,370, incorporated herein by reference. For instance, it may be desirable to employ peroxide coupling agents in conjunction with silane coupling agents, peroxide coupling agents in conjunction with radiation, sulfur-containing coupling agents in conjunction with silane coupling agents, etc.

The foam structures of the present invention are optionally made by a conventional extrusion foaming process. The structure is advantageously prepared by heating the polymer or blend to form a plasticized or melt polymer material, incorporating therein a blowing agent to form a foamable gel, and extruding the gel through a die to form the foam product. Depending upon the die (with an appropriate number of apertures) and operating conditions, the product may vary from an extruded foam plank or rod through a coalesced foam strand product, to foam beads and eventually to chopped strands of foamable beads. Prior to mixing with the blowing agent, the polymer material is heated to a temperature at or above its glass transition temperature or melting point. The blowing agent is optionally incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to advantageously disperse the blowing agent homogeneously therein. Optionally, a nucleator is optionally blended in the polymer melt or dry blended with the polymer material prior to plasticizing or melting. Prior to extruding foamable gel through the die, one typically cools the gel to an optimum temperature. The foamable gel is typically cooled to a lower temperature to optimize physical characteristics of the foam structure. This temperature, often referred to as the foaming temperature, is typically above each component's polymer glass transition temperature ($T_g$), or for those having sufficient crystallinity, near the peak crystalline melting temperature ($T_m$). "Near" means at, above, or below and largely depends upon where stable foam exists. The temperature desirably falls within 30° centigrade (° C.) above or below the $T_m$. For foams of the present invention, an optimum foaming temperature is in a range in which the foam does not collapse. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure is optionally superatmospheric or subatmospheric (vacuum), but is preferably at an atmospheric level.

In another embodiment, the resulting foam structure is optionally formed in a coalesced strand form by extrusion of the polymer material through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,824,720.

Alternatively, the resulting foam structure is conveniently formed by an accumulating extrusion process and apparatus as seen in U.S. Pat. No. 4,323,528 and U.S. Pat. No. 5,817,705. This apparatus, commonly known as an "extruder-accumulator system" allows one to operate a process on an intermittent, rather than a continuous, basis. The apparatus includes a holding zone or accumulator where foamable gel remains under conditions that preclude foaming. The holding zone is equipped with an outlet die that opens into a zone of lower pressure, such as the atmosphere. The die has an orifice that may be open or closed, preferably by way of a gate that is external to the holding zone. Operation of the gate does not affect the foamable composition other than to allow it to flow through the die. Opening the gate and substantially concurrently applying mechanical pressure on the gel by a mechanism (for example, a mechanical ram) forces the gel through the die into a zone of lower pressure. The mechanical pressure is sufficient to force foamable gel through the die at a rate fast enough to preclude significant foaming within the die yet slow enough to minimize and preferably eliminate generation of irregularities in foam cross-sectional area or shape. As such, other than operating intermittently, the process and its resulting products closely resemble those made in a continuous extrusion process.

In the accumulating extrusion process, low density foam structures having large lateral cross-sectional areas are prepared by: 1) forming under pressure a gel of the polymer or blend material and a blowing agent at a temperature at which the viscosity of the gel is sufficient to retain the blowing agent when the gel is allowed to expand; 2) extruding the gel into a holding zone maintained at a temperature and pressure which does not allow the gel to foam, the holding zone having an outlet die defining an orifice opening into a zone of lower pressure at which the gel foams, and an openable gate closing the die orifice; 3) periodically opening the gate; 4) substantially concurrently applying mechanical pressure by a movable ram on the gel to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected gel to expand unrestrained in at least one dimension to produce the foam structure.

The present foam structures may also be formed into foam beads suitable for molding into articles by expansion of pre-expanded beads containing a blowing agent. The beads may be molded at the time of expansion to form articles of various shapes. Processes for making expanded beads and molded expanded beam foam articles are described in Plastic Foams, Part II, Frisch and Saunders, pp. 544–585, Marcel Dekker, Inc. (1973) and Plastic Materials, Brydson, 5th ed., pp. 426–429, Butterworths (1989). Expandable and expanded beads can be made by a batch or by an extrusion process, and may be substantially non-crosslinked or substantially crosslinked.

The batch process of making expandable beads is similar to manufacturing expandable polystyrene (EPS). The resulting foam structure is formed into non-crosslinked foam beads suitable for molding into articles. Discrete resin particles, such as granules made from the blends of the present invention, made either by melt blending or in-reactor blending, are impregnated with a blowing agent (and optionally a cross-linking agent) in an aqueous suspension or in an anhydrous state in a pressure vessel at an elevated temperature and pressure. In the case of the aqueous supsension, the blowing agent (and, optionally, cross-linking agent) is/are introduced into the liquid medium in which the granules are substantially insoluble (such as water) at an elevated pressure and temperature in an autoclave or other pressure vessel. The granules are either discharged rapidly into an atmosphere or a region of reduced pressure to expand the granules into foam beads or cooled and discharged as unexpanded beads. In a separate step, the unexpanded beads are heated to expand them, for example, with steam or with hot air. This process for making bead foams is well taught in U.S. Pat. Nos. 4,379,859 and 4,464,484.

In a modification of the bead process, styrene monomer is optionally impregnated into the suspended pellets of the blend compositions of the present invention prior to their impregnation with blowing agent to form a graft interpolymer with the polymer material. The resulting interpolymer beads are cooled and discharged from the vessel substantially unexpanded. The beads are then expanded and molded by an expanded polystyrene bead molding process within the skill in the art. Such a process of making such polyethylene/polystyrene interpolymer beads is described for instance in U.S. Pat. No. 4,168,353.

A variation of the foregoing extrusion process readily yields expandable thermoplastic polymer beads. The method tracks with the conventional foam extrusion process described above up to the die orifice, which now contains one or multiple holes. The variation requires (a) cooling the foamable gel to a temperature below that at which foaming occurs, (b) extruding cooled gel through a die containing one or more orifices to form a corresponding number of essentially continuous expandable thermoplastic strands, (c) optionally quenching the strands exiting the die orifice in a cold water bath; and (d) and pelletizing the expandable thermoplastic strands to form expandable thermoplastic beads. Alternatively, the strands are converted to foam beads by cutting the strands into pellets or granules at the die face and allowing the granules to expand.

The foam beads can also be prepared by preparing a mixture of the polymer blend compositions of the present invention, cross-linking agent, and chemical blowing agent in a suitable mixing device or extruder and form the mixture into pellets, and heat the pellets to cross-link and expand.

In another process for making cross-linked foam beads suitable for molding into articles, the blends of this invention are melted and mixed with a physical blowing agent in a conventional foam extrusion apparatus to form an essentially continuous foam strand. The foam strand is granulated or pelletized to form foam beads. The foam beads are then cross-linked by radiation. The cross-linked foam beads may then be coalesced and molded to form various articles as described above for the other foam bead process. Additional teachings to this process are seen in U.S. Pat. No. 3,616,365 and C. P. Park, "Polyolefin Foam", Handbook of Polymer Foams and Technology, edited by D. Klempner and K. C. Frisch, Hanser Publishers, Munich, Vienna, New York, Barcelona (1991), pp. 224–228.

The foam beads may then be molded by any means known in the art, such as charging the foam beads to the mold, compressing the mold to compress the beads, and heating the beads such as with steam to effect coalescing and welding of the beads to form the article. Optionally, the beads may be impregnated with air or other blowing agent at an elevated pressure and temperature prior to charging to the mold. Further, the beads may optionally be heated prior to charging. The foam beads are conveniently then molded to blocks or shaped articles by a suitable molding method known in the art. Some of the methods are taught in U.S. Pat. Nos. 3,504,068 and 3,953,558. Excellent teachings of the above processes and molding methods are seen in C. P. Park, supra, p. 191, pp. 197–198, and pp. 227–233, U.S. Pat. No. 3,886,100, U.S. Pat. No. 3,959,189, U.S. Pat. No. 4,168,353 and U.S. Pat. No. 4,429,059.

The present crosslinked foam structure may also be made into a continuous plank structure by an extrusion process utilizing a long-land die as described in GB 2,145,961A. In that process, the polymer, chemical blowing agent and cross-linking agent are mixed in an extruder, heating the mixture to let the polymer cross-link and the blowing agent to decompose in a long-land die; and shaping and conducting away from the foam structure through the die with the foam structure and the die contact lubricated by a proper lubrication material.

The present crosslinked foam structure may be made in bun stock form by two different processes. One process involves the use of a cross-linking agent and the other uses radiation.

The present crosslinked foam structure may be made in bun stock form by mixing the polymer compositions of this invention, a cross-linking agent, and a chemical blowing agent to form a slab, heating the mixture in a mold so the cross-linking agent can cross-link the polymer material and the blowing agent can decompose, and expanding by release of pressure in the mold. Optionally, the bun stock formed upon release of pressure may be re-heated to effect further expansion.

Foam may be made from cross-linked polymer sheet by either irradiating polymer sheet with high energy beam or by heating a polymer sheet containing chemical cross-linking agent. The cross-linked polymer sheet is cut into the desired shapes and impregnated with nitrogen in a higher pressure at a temperature above the softening point of the polymer; releasing the pressure effects nucleation of bubbles and some expansion in the sheet. The sheet is re-heated at a lower pressure above the softening point, and the pressure is then released to allow foam expansion.

Blowing agents useful in making the foam structures of the present invention include inorganic agents, organic blowing agents and chemical blowing agents. Suitable inorganic blowing agents include carbon dioxide, nitrogen, argon, water, air, sulfur hexafluoride ($SF_6$) and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), fluoroethane (HFC-161), 1,1,1-trifluoroethane (HFC-143a), 1,1,1,2-tetrafluoroethane (HFC-134a), 1,1,2,2-tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1 fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC- 12), trichlorotrifluoroethane (CFC-113), dichlorotetrafluoroethane (CFC-114), chloroheptafluoropropane, and dichlorohexafluoropropane. Chemical blowing agents include azodicarbonamide, azodiisobutyro-nitrile, barium azodicarboxylate, N,N'-dimethyl-N,N'-dinitrosoterephthalamide, and benzenesulfonhydrazide, 4,4-oxybenzene sulfonyl semicarbazide, and p-toluene sulfonyl semicarbazide, trihydrazino triazine and mixtures of citric acid and sodium bicarbonate such as the various products sold under the name Hydrocerol™ (a product of Boehringer Ingelheim). Any of the foregoing blowing agents may be used singly or in combination with one or more other blowing agents. Preferred blowing agents include isobutane, carbon dioxide, HFC-152a, and mixtures of the foregoing.

The amount of blowing agent incorporated into the polymer melt material to make a foam-forming polymer gel is from 0.05 to 5.0, preferably from 0.2 to 3.0, and most preferably from 0.5 to 2.5 gram moles per kilogram of polymer.

Foams are optionally perforated to enhance or accelerate gaseous permeation exchange wherein blowing agent exits from the foam and air enters into the foam. The resulting perforated foams have defined therein a multiplicity of channels that are preferably free of direction with respect to the longitudinal extension of the foam. The channels extend from one foam surface at least partially through the foam, and sometimes completely through the foam from one external surface to another external surface. The channels are advantageously present over substantially an entire exterior foam surface, preferably with uniform or substantially uniform spacing. Suitable spacing intervals may be up to and including 2.5 centimeters (cm), preferably up to and including 1.3 cm. The foams optionally employ a stability control agent of the type described above in combination with perforation to allow accelerated permeation or release of blowing agent while maintaining a dimensionally stable foam. U.S. Pat. No. 5,424,016, U.S. Pat. No. 5,585,058, WO 92/19439 and WO 97/22455, provide excellent information relative to perforation. If desired, the foams of this invention may be post-treated by any known means to increase foam open cell content. Such post-treatment methods include, without limit, mechanically compressing the foam and expanding the foam by exposure to steam and/or hot air.

Foams of the present invention generally have a density less than 900, preferably less than 850, more preferably less than 800 kg/m$^3$, even more preferably from 5 to 700 kilograms per cubic meter, and most preferably from 5 to 200 kilograms per cubic meter (in accordance with ASTM D3575-93, Suffix W, Method B). The foams may be microcellular (i.e, with a cell size from less than about 0.05 mm, preferably from about 0.001 mm, to about 0.05 mm) or macrocellular (i.e., cell size of about 0.05 mm or more). The macrocellular foam has an average cell size of about 0.05 to about 15, preferably from about 0.1 to about 10.0, and more preferably from about 0.1 to about 5 millimeters, preferably from about 0.2 to about 3 millimeters, and more preferably about 0.2 to about 2 millimeters as measured according to the procedures of ASTM D3576-77. The preferred ranges of density and cell size should not be taken as limiting the scope of this invention.

Foams of the present invention preferably exhibit excellent dimensional stability. Preferred foams retain 80 or more percent of their initial volume when measured one month after an initial volume measurement within 30 seconds after foam expansion. Volume is measured by any suitable method such as cubic displacement of water.

The foams of the present invention have an open cell content that ranges from 0 to 100 volume percent based on the total volume of foam, as measured according to ASTM D2856-94, depending upon component selection and process condition variations. Foams with an open cell content of 30 vol percent or less generally fall in a class known as closed cell foams. Those known as open cell foams typically have an open cell content greater than 30, preferably greater than 40, and more preferably greater than 50 vol percent. The open cell content is desirably 100 vol percent or less, preferably 95 vol percent or less, and more preferably 90 vol percent or less.

The foams of density less than 100 kg/m$^3$ generally have an Asker-C hardness of $\leq 90$, desirably $\leq 80$, and preferably $\leq 70$. Hardness measurements of the foams use an Asker C durometer for cellular rubber and yarn in accordance with ASTM D2240-97, using a 5 mm diameter spherical indentor.

If the foam is in the shape of a sheet or plank, it has a thickness that is generally $\geq 0.5$ mm, preferably $\geq 1$ mm and a width that is generally 25 mm, preferably $\geq 10$ mm. As used herein "thickness" of a foam plank or sheet refers to its smallest cross-sectional dimension (for example, as measured from one planar surface to an opposing planar surface). When the foam is present as a round or rod, it has a diameter that is generally $\geq 5$ mm, preferably $\geq 10$ mm.

The foam has a drop-test optimum C-factor (ASTM-D1596) of $\leq 6$, desirably $\leq 5$, and preferably $\leq 4$.

Various additives may optionally be incorporated into the compositions or foams of the present invention. The additives include, without limitation, stability control agents, nucleating agents, inorganic fillers, conductive fillers, pigments, colorants, antioxidants, acid scavengers, ultraviolet absorbers or stabilizers, flame retardants, processing aids, extrusion aids, anti-static agents, cling additives (for example, polyiso-butylene), antiblock additives, other thermoplastic polymers. Certain of the additives, such as inorganic and conductive fillers, may also function as nucleating agents and/or open cell promoters for foams. Examples of antioxidants are hindered phenols (such as, for example, Irganox™ 1010) and phosphites (for example, Irgafos™ 168) both trademarks of, and commercially available from, Ciba Geigy Corporation.

The additives are advantageously employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.02 to 5, more preferably from 0.03 to 2 percent by weight based upon the weight of the polymer or polymer blend. Similarly, the amounts of any of the other enumerated additives are the functionally equivalent amounts.

A nucleating agent is optionally added to control the size of foam cells. Preferred nucleating agents include inorganic substances such as calcium carbonate, talc, clay, titanium dioxide, silica, barium stearate, calcium stearate, diatomaceous earth, mixtures of citric acid and sodium bicarbonate, and the like. When used, the amount of nucleating agent employed advantageously ranges from about 0.01 to about 5 parts by weight per hundred parts by weight of a polymer resin.

In the manufacture of foams, a stability control agent (also known as permeability modifier) is optionally added to the present foam to enhance dimensional stability. Preferred agents include amides and esters of C10–24 fatty acids. Such agents are seen in U.S. Pat. Nos. 3,644,230 and 4,214,054. Esters may also reduce static during and after foam manufacture. Most preferred agents include stearyl stearamide, glyceromonostearate, glycerol monobehenate, and sorbitol monostearate. When used, such stability control agents are typically employed in an amount ranging from $\geq 0$ to about 10 parts per hundred parts of the polymer.

The foams of the present invention may be used in any application where foams of comparable density and open or closed cell contents are used today. Such applications include, without limit, cushion packaging (for example, corner blocks, braces, saddles, pouches, bags, envelopes, overwraps, interleafing, encapsulation) of finished electronic goods such as computers, televisions, and kitchen appliances; packaging or protection of explosive materials or devices; material handling (trays, tote boxes, box liners, tote box inserts and dividers, shunt, stuffing, boards, parts spacers and parts separators); work station accessories (aprons, table and bench top covers, floor mats, seat cushions); automotive (headliners, impact absorption in bumpers or doors, carpet underlayment, sound insulation); flotation (for example, life jackets, vests and belts); sports and leisure or athletic and recreational products (for example, gym mats and bodyboards); egg cartons, meat trays, fruit trays, thermal insulation (such as that used in building and construction for wall sheathing, roofing, foundation insulation and residing underlayment); acoustical insulation (for example, for appliances and building and construction); pipe insulation, insulation for refrigeration, buoyancy applications (e.g., floatintg docks and rafts), floral and craft products, pallets, luggage liners, desk pads, footwear (including shoe soles), insulation blankets for greenhouses, case inserts, display foams, gaskets, grommets, seals; sound attenuation for printers and typewriters; display case insert; missile container padding; military shell holder; blocking and bracing of various items in transport; preservation and packaging; automotives anti-rattle pads, seals; medical devices, skin contact pads; cushioned pallet; and vibration isolation pad. The foregoing list merely illustrates a number of suitable applications. Skilled artisans can readily envision additional applications without departing from the scope or spirit of the present invention.

In another aspect, the polymer compositions of this invention may be used to make foamed films. The film of the present invention may be a monolayer or a multilayer film. One or more layers of the film may be oriented or foamed. A multi-layer film of the present invention may contain one, two or more layers comprising a blend as defined herein. In one embodiment, the film according to the invention has a thickness of 0.5 to 100 mils. Preferably, the present invention pertains to a tough and stiff film, comprising the blends of this invention. The film of the invention may be printed. The film of the invention is obtainable according to methods known in the art. The film may be made using a blown or a cast film extrusion process, including co-extrusion and extrusion coating. One or more layers of the film may be expanded, for example with a conventional blowing agent, to make foamed film. One or more films may be laminated to form a multi-layer structure. Preferred are two-layer or three-layer films with one or two surface layers and the foamed layer being the core layer. The surface layers may or may not comprise the blends of this invention. In a three layer structure, preferably, the foamed layer is the core or middle layer. The films may be (further) oriented after forming via tenter frame, double-bubble or other blown film techniques.

Foamed film is especially suitable for use as label or in thermoformable articles of manufacture. To make foamed film structures, either physical or chemical blowing agents may be used. A multilayer film of the invention comprising one or more foamed layers comprising the polymer compositions as defined herein is obtainable according to methods known in the art, for example, using a co-extrusion process.

The label film may be constructed from printed, slit to width, rolls of film with the labels glued to a container, for example a bottle, using conventional adhesives and glues known to the industry. In addition, the films of this invention may be printed, coated with pressure sensitive adhesives, laminated to release papers or films and applied to bottles, containers or other surfaces by conventional pressure sensitive techniques. The bottle may be a glass bottle or a PET bottle. Covering or affixed to a glass bottle, the label may also serve a protective purpose. If the bottle is a PET bottle, the preferred label is a wrap-around label.

The foregoing list merely illustrates a number of suitable applications. Skilled artisans can readily envision additional applications without departing from the scope or spirit of the present invention.

The following examples are illustrative of the invention, but are not to be construed as to limiting the scope thereof in any manner.

EXAMPLES

Blend Components Used in These Studies

HDPE 05862N is a high density polyethylene (a product of The Dow Chemical Company) having a nominal melt index (I2) of 5 g/10 min and a nominal density of 0.9625 g/cm$^3$.

HDPE 10462N is a high density polyethylene (a product of The Dow Chemical Company) having a nominal melt index (I2) of 10 g/10 min and a nominal density of 0.9625 g/cm$^3$.

AFFINITY™ SM1300 (a product and trademark of The Dow Chemical Company) has a nominal melt index (I2) of 30 g/10 min and a nominal density of 0.9020 g/cm$^3$.

AFFINITY™ PL1280 (a product and trademark of The Dow Chemical Company) has a nominal melt index (I2) of 6 g/10 min and a nominal density of 0.9000 g/cm$^3$.

DSV 10305.00 is a high density polyethylene (a product of The Dow Chemical Company) having a nominal melt index (I2) of 1.1 g/10 min and a nominal density of 0.9570 g/cm$^3$.

LDPE 662i is a low density polyethylene (a product of The Dow Chemical Company) having a nominal melt index (I2) of 0.5 g/10 min and a nominal density of 0.9190 g/cm$^3$.

LDPE 620i is a low density polyethylene (a product of The Dow Chemical Company) having a nominal melt index (I2) of 1.8 g/10 min and a nominal density of 0.9239 g/cm$^3$.

LDPE 722 (a product of The Dow Chemical Company) has a nominal melt index (I2) of 8 g/10 min and a nominal density of 0.9180 g/cm$^3$.

LDPE 4012 (a product of The Dow Chemical Company) has a nominal melt index (I2) of 12 g/10 min and a nominal density of 0.9180 g/cm$^3$.

Examples 1–10 and Comparative Examples 1–6

Mixtures of high density polyethylene (HDPE) and low density polyethylene (LDPE) were dry blended and subsequently compounded on a Leistreitz 18mm twin screw extruder with L/D=30 at 200 rpm. The polymers used were HDPE 05862N, HDPE 10462N and DSV10305.00 and LDPE 662i. Example 1 also contained 0.4 weight percent mineral oil. The other examples and comparative examples did not contain mineral oil. Temperature settings were: Zone 1—130° C.; zone 2—170° C.; zone 3—190° C.; zone 4—190° C.; zone 5—190° C.; die—190° C. The melt temperatures ranged from 205° C. to 211° C. The data are presented in Table 1. The comparative examples were the individual polymers, or blends thereof, that were extruded at the same process settings, but did not meet the criteria of the inventive examples.

The measured melt strength of the blends of the present invention was considerably greater than that predicted from a linear relationship. The melt strength ranged from 3.2 cN to 33.0 cN over a wide range of melt index (0.46 dg/min to 4.92 dg/min). These ranges of melt strength and melt index are appropriate for making a variety of foams (different densities, different shapes and geometries, cross-linked, non-crosslinked, etc). The melt strength of the inventive blends was greater than that of HDPE of similar melt index (Comparative Example 1 versus Example 1; Comparative Example 3 versus Examples 6–8). The inventive blend of Example 10 exhibited similar melt strength as LDPE 662i (Comparative Example 4), but the melt index of the blend was higher and its flexural modulus was significantly greater. The flexural modulus of the inventive blends was greater than 100,000 psi, and even as high as that of HDPE (Comparative Examples 1–3 versus Examples.1–3). The upper service temperature of the inventive blends was greater than 120° C.

Examples 11–14 and Comparative Examples 7–8

Mixtures of HDPE 05862N and LDPE 620i were dry blended and subsequently compounded on a Leistreitz 18 mm twin screw extruder with L/D=30 at 200 rpm. Temperature settings were: Zone 1—130° C.; zone 2—170° C.; zone 3—190° C.; zone 4—190° C.; zone 5—190° C.; die—190° C. Melt temperatures ranged from 204° C. to 211° C. The data are presented in Table 2. The comparative examples were the blends that did not meet the flexural modulus criterion of the inventive examples.

Examples 15–18 and Comparative Examples 9–18

Mixtures of AFFINITY™ SM1300 and various grades of LDPE were dry blended and subsequently compounded on a Leistreitz 18mm twin screw extruder with L/D=30 at 100 rpm. Temperature settings were: Zone 1—185° C.; zone 2—185° C.; zone 3—185° C.; zone 4—185° C.; zone 5—185° C.; die—185° C. The data are presented in Table 3. The comparative examples were the blends that did not meet one or more of the criterion of the inventive examples.

Examples 19–33

Mixtures of AFFINITY™ PL1280 and various grades of LDPE were dry blended and subsequently compounded on a Leistreitz 18mm twin screw extruder with L/D=30 at 100 rpm. Temperature settings were: Zone 1—185° C.; zone 2—185° C.; zone 3—185° C.; zone 4—185° C.; zone 5—185° C.; die—185° C. The data are presented in Table 4.

TABLE 1

HDPE, LDPE and Blends Comprising LDPE 662i

| | Comp A | Wt % A | Comp B | Wt % B | I2 (g/10 min) | Measured Melt strength (cN) | Predicted Melt Strength (cN)* | $F_{MS}$ | Melt Extensibility (mm/s) | Flex Modulus (psi) | UST (° C.) |
|---|---|---|---|---|---|---|---|---|---|---|---|
| Comp Ex 1 | HDPE 05862N | 100 | None | 0 | 5.16 | 1.0 | N/A | N/A | 250 | 232032 | 141.5 |
| Comp Ex 2 | HDPE 10462N | 100 | None | 0 | 8.61 | 0.7 | N/A | N/A | 155 | 248627 | 143.3 |
| Comp Ex 3 | DSV 10305.00 | 100 | None | 0 | 1.11 | 4.3 | N/A | N/A | 110 | 192315 | 133.6 |
| Comp Ex 4 | None | 0 | LDPE 662i | 100 | 0.32 | 33.5 | N/A | N/A | 78 | 40202 | 113.7 |
| Comp Ex 5 | HDPE 05862N | 25 | LDPE 662i | 75 | 0.61 | 32.0 | 18.68 | 1.71 | 95 | 74191 | 127.4 |
| Comp Ex 6 | DSV 10305.00 | 25 | LDPE 662i | 75 | 0.34 | 42.0 | 27.41 | 1.53 | 88 | 70856 | 133.7 |
| Ex 1 | HDPE 10462N | 80 | LDPE 662i | 20 | 4.92 | 7.7 | 2.15 | 3.58 | 380 | 195144 | 129.5 |
| Ex 2 | HDPE 05862N | 95 | LDPE 662i | 5 | 4.46 | 3.2 | 1.54 | 2.08 | 430 | 218739 | 143.4 |
| Ex 3 | HDPE 05862N | 90 | LDPE 662i | 10 | 4.16 | 5.2 | 1.87 | 2.78 | 350 | 210480 | 141.4 |
| Ex 4 | HDPE 05862N | 75 | LDPE 662i | 25 | 2.51 | 12.5 | 3.70 | 3.37 | 240 | 176754 | 139.3 |
| Ex 5 | HDPE 05862N | 65 | LDPE 662i | 35 | 1.93 | 17.5 | 5.27 | 3.32 | 160 | 160499 | 137.5 |
| Ex 6 | HDPE 05862N | 50 | LDPE 662i | 50 | 1.18 | 24.0 | 9.09 | 2.64 | 130 | 111942 | 135.1 |
| Ex 7 | DSV 10305.00 | 95 | LDPE 662i | 5 | 0.96 | 7.5 | 4.17 | 1.80 | 110 | 166726 | 140.8 |
| Ex 8 | DSV 10305.00 | 90 | LDPE 662i | 10 | 0.96 | 10.5 | 4.86 | 2.16 | 150 | 156802 | 140.7 |
| Ex 9 | DSV 10305.00 | 75 | LDPE 662i | 25 | 0.63 | 20.0 | 9.14 | 2.19 | 155 | 136443 | 138.7 |
| Ex 10 | DSV 10305.00 | 50 | LDPE 662i | 50 | 0.46 | 33.0 | 16.85 | 1.96 | 105 | 104505 | 124.9 |

*Predicted melt strength calculated from rule of mixtures i.e. Blend MS = $MS_B$ + (wt % A * ($MS_A$–$MS_B$)/100), where $MS_A$ and $MS_B$ were the melt strengths of components A and B at the melt index of the blend.

TABLE 2

HDPE 05862N/LDPE 620i Blends

| | Component A | Wt % A | Component B | Wt % B | Melt Index, I2 (g/10 min) | Measured Melt strength (cN) | Predicted Melt Strength (cN) from Linear Composition Model | $F_{MS}$ | Measured Melt Extensibility (mm/s) | Calculated Flexural Modulus (psi) |
|---|---|---|---|---|---|---|---|---|---|---|
| Comp Ex 7 | HDPE 05862N | 20 | LDPE 620i | 80 | 1.39 | 19.5 | 11.4 | 1.71 | 218 | 78093 |
| Comp Ex 8 | HDPE 05862N | 10 | LDPE 620i | 90 | 1.30 | 20.0 | 13.1 | 1.53 | 176 | 64907 |

TABLE 2-continued

HDPE 05862N/LDPE 620i Blends

|  | Component A | Wt % A | Component B | Wt % B | Melt Index, I2 (g/10 min) | Measured Melt strength (cN) | Predicted Melt Strength (cN) from Linear Composition Model | $F_{MS}$ | Measured Melt Extensibility (mm/s) | Calculated Flexural Modulus (psi) |
|---|---|---|---|---|---|---|---|---|---|---|
| Ex 11 | HDPE 05862N | 90 | LDPE 620i | 10 | 4.22 | 3.8 | 1.85 | 2.05 | 375 | 210740 |
| Ex 12 | HDPE 05862N | 80 | LDPE 620i | 20 | 3.92 | 6.6 | 2.49 | 2.65 | 449 | 189880 |
| Ex 13 | HDPE 05862N | 60 | LDPE 620i | 40 | 2.45 | 11.9 | 4.89 | 2.44 | 265 | 147820 |
| Ex 14 | HDPE 05862N | 35 | LDPE 620i | 65 | 1.73 | 17.2 | 8.49 | 2.03 | 236 | 101366 |

Predicted melt strength calculated from rule of mixtures i.e. Blend MS = $MS_B$ + (wt % A * ($MS_A$–$MS_B$)/100), where $MS_A$ and $MS_B$ were the melt strengths of components A and B at the melt index of the blend.
Calculated Flexural modulus was determined using the following equation: Modulus (psi) = 1000.Ea(L − E.k.X)/(L + X.k)
Where: E = $Ac^{b.X}$; k = Ea − Ec; L = Ec + E.Ea; X = (Density − 0.852)/0.148
and: A = 6.423; b = 6.283; Ea = 0.574; Ec = 376.7 and Density is the density of the resin blend in g/cm³

TABLE 3

Blends Of AFFINITY ™ SM1300 With LDPE

|  | Comp A | Wt % A | Comp B | Wt % B | I2 (g/10 min) | Melt strength (cN) | Predicted Melt Strength (cN) | $F_{MS}$ | Melt Extensibility (mm/s) | Calculated Flexural Modulus (psi) |
|---|---|---|---|---|---|---|---|---|---|---|
| Comp Ex 9 | AFFINITY ™ SM1300 | 85 | LDPE 620i | 15 | 20.3 | 0 | 0.76 | 0.00 | N/A | 18095 |
| Comp Ex 10 | AFFINITY ™ SM1300 | 25 | LDPE 620i | 75 | 3.6 | 9.2 | 5.83 | 1.58 | N/A | 39379 |
| Comp Ex 11 | AFFINITY ™ SM1300 | 10 | LDPE 620i | 90 | 2.5 | 12 | 8.51 | 1.41 | N/A | 47486 |
| Comp Ex 12 | AFFINITY ™ SM1300 | 90 | LDPE 662i | 10 | 22 | 0.8 | 0.63 | 1.26 | N/A | 16893 |
| Comp Ex 13 | AFFINITY ™ SM1300 | 90 | LDPE 722 | 10 | 27.6 | 0 | 0.55 | 0.00 | N/A | 16370 |
| Comp Ex 14 | AFFINITY ™ SM1300 | 80 | LDPE 722 | 20 | 23.5 | 0.4 | 0.78 | 0.52 | N/A | 18095 |
| Comp Ex 15 | AFFINITY ™ SM1300 | 50 | LDPE 722 | 50 | 15.4 | 1.4 | 1.69 | 0.83 | N/A | 24140 |
| Comp Ex 16 | AFFINITY ™ SM1300 | 40 | LDPE 722 | 60 | 12.1 | 3.1 | 2.24 | 1.38 | N/A | 26567 |
| Comp Ex 17 | AFFINITY ™ SM1300 | 25 | LDPE 722 | 75 | 11.3 | 4 | 2.75 | 1.45 | N/A | 30611 |
| Comp Ex 18 | AFFINITY ™ SM1300 | 15 | LDPE 722 | 85 | 8.6 | 5.2 | 3.62 | 1.44 | N/A | 33781 |
| Ex 15 | AFFINITY ™ SM1300 | 70 | LDPE 620i | 30 | 15.4 | 2.5 | 1.24 | 2.01 | N/A | 22176 |
| Ex 16 | AFFINITY ™ SM1300 | 50 | LDPE 620i | 50 | 8.2 | 5.4 | 2.55 | 2.11 | N/A | 28697 |
| Ex 17 | AFFINITY ™ SM1300 | 80 | LDPE 662i | 20 | 15 | 3 | 1.04 | 2.89 | N/A | 18208 |
| Ex 18 | AFFINITY ™ SM1300 | 50 | LDPE 662i | 50 | 3.9 | 12.5 | 4.16 | 3.01 | N/A | 24580 |

Predicted melt strength calculated from rule of mixtures i.e. Blend MS = $MS_B$ + (wt % A * ($MS_A$–$MS_B$)/100), where $MS_A$ and $MS_B$ were the melt strengths of components A and B at the melt index of the blend.
Calculated Flexural modulus was determined using the following equation: Modulus (psi) = 100.Ea(L − E.k.X)/(L + X.k)
Where: E = $Ae^{b.X}$; k = Ea − Ec; L = Ec + E.Ea; X = (Density − 0.852)/0.148
and: A = 6.423; b = 6.283; Ea = 0.574; Ec = 376.7, and Density is the density of the resin blend in g/.cm³.

TABLE 4

Blends Of AFFINITY ™ PL1280 With LDPE

|  | Comp A | Wt % A | Comp B | Wt % B | I2 (g/10 min) | Melt strength (cN) | Predicted Melt Strength (cN) | $F_{MS}$ | Melt Extensibility mm/s actual | Calculated Flexural Modulus (psi) |
|---|---|---|---|---|---|---|---|---|---|---|
| Ex 19 | AFFINITY ™ PL1280 | 90 | LDPE 722 | 10 | 5.56 | 2.4 | 1.55 | 1.55 | 345 | 14609 |
| Ex 20 | AFFINITY ™ PL1280 | 85 | LDPE 722 | 15 | 5.24 | 3.0 | 1.84 | 1.63 | 315 | 15467 |
| Ex 21 | AFFINITY ™ PL1280 | 80 | LDPE 722 | 20 | 5.17 | 3.7 | 2.08 | 1.78 | 310 | 16268 |
| Ex 22 | AFFINITY ™ PL1280 | 50 | LDPE 722 | 50 | 5.66 | 6.2 | 3.26 | 1.90 | 395 | 22722 |
| Ex 23 | AFFINITY ™ PL1280 | 40 | LDPE 722 | 60 | 5.31 | 6.3 | 3.84 | 1.64 | 350 | 25329 |
| Ex 24 | AFFINITY ™ PL1280 | 25 | LDPE 722 | 75 | 6.35 | 6.8 | 4.02 | 1.69 | 365 | 29728 |
| Ex 25 | AFFINITY ™ PL1280 | 90 | LDPE 662i | 10 | 4.02 | 4.2 | 1.91 | 2.20 | 265 | 14609 |
| Ex 26 | AFFINITY ™ PL1280 | 85 | LDPE 662i | 15 | 3.50 | 6.2 | 2.39 | 2.59 | 380 | 15467 |
| Ex 27 | AFFINITY ™ PL1280 | 80 | LDPE 662i | 20 | 3.29 | 7.3 | 2.80 | 2.61 | 300 | 16370 |
| Ex 28 | AFFINITY ™ PL1280 | 50 | LDPE 662i | 50 | 1.44 | 16.4 | 7.98 | 2.06 | 160 | 23139 |
| Ex 29 | AFFINITY ™ PL1280 | 90 | LDPE 4012 | 10 | 5.64 | 2.1 | 1.54 | 1.37 | 305 | 14609 |
| Ex 30 | AFFINITY ™ PL1280 | 85 | LDPE 4012 | 15 | 5.80 | 2.5 | 1.72 | 1.45 | 300 | 15467 |
| Ex 31 | AFFINITY ™ PL1280 | 80 | LDPE 4012 | 20 | 5.88 | 2.6 | 1.91 | 1.36 | 230 | 16268 |
| Ex 32 | AFFINITY ™ PL1280 | 50 | LDPE 4012 | 50 | 6.64 | 4.0 | 2.93 | 1.36 | 205 | 22722 |
| Ex 33 | AFFINITY ™ PL1280 | 25 | LDPE 4012 | 75 | 8.26 | 5.2 | 3.38 | 1.54 | 380 | 29728 |

Calculated Flexural modulus was determined using the following equation: Modulus (psi) = 1000.Ea(L − E.k.X)/(L + X.k)

TABLE 4-continued

Blends Of AFFINITY ™ PL1280 With LDPE

| Comp A | Wt % A | Comp B | Wt % B | I2 (g/10 min) | Melt strength (cN) | Predicted Melt Strength (cN) | $F_{MS}$ | Melt Extensibility mm/s actual | Calculated Flexural Modulus (psi) |
|---|---|---|---|---|---|---|---|---|---|

Where: $E = Ae^{b \cdot X}$; $k = Ea - Ec$; $L = Ec + E \cdot Ea$; $X = (Density - 0.852)/0.148$
and: $A = 6.423$; $b = 6.283$; $Ea = 0.574$; $Ec = 376.7$, and Density is the density of the resin blend in g/.cm³.

Examples 34–36 and Comparative Example 19

A mixture of high density polyethylene (HDPE) and LDPE was melt blended on a 40 mm twin screw extruder at 252 rpm and 175 lb/hr. The temperature profile in the extruder was: zone 2—171° C.; zone 3—190° C.; zone 4—208° C.; zone 5—218° C; zone 6—229° C.; zone 7—241° C.; zone 8—214° C.; zone 9—224° C.; die—221° C. The final melt temperature was 285° C. The final properties of the blend are presented in Table 5. This blend composition is intermediate between the compositions of Examples 9 and 10 (Table 5).

TABLE 5

Blend of LDPE and HDPE

| | Blend Composition | I2 (g/10 min) | Density (g/cm³) | Melt Tension (g) | Melt Strength (cN) | Melt Extensibility (mm/s) | Flex Modulus (psi) |
|---|---|---|---|---|---|---|---|
| Ex 34 | 35 weight percent LDPE 662i 65 wt percent HDPE DSV 10305.00 | 0.51 | 0.9423 | 10.5 | 25.4 | 130 | 122987 |

The blend of Example 34 was subsequently foamed using an extrusion foaming process with isobutane as blowing agent. Comparative Example 19 was a conventional foam made from LDPE 662i. Glycerol monostearate (GMS) was used as permeability modifier and talc as nucleator. The properties of the resulting foams are summarized in Table 6. NOTE: "phr" corresponds to part-per-hundred resin.

TABLE 6

Foam from Blend of LDPE and HDPE

| | Polymer Composition | Talc (phr) | GMS (phr) | Isobutane (phr) | Foam Density (kg/m³) - ASTM D3575-93 Suffix W | Open Cells (volume percent) - ASTM D2856-87 | 3D Av Cell Size (mm) (foam age 7 Days) | Normalized Compressive Strength (psi/pcf) @ 5/10/25/50/75% Deflection ASTM D3575-93 Suffix D (foam age 28 Days) |
|---|---|---|---|---|---|---|---|---|
| Comp Ex 19 | LDPE 662i | 0.5 | 0.3 | 12 | 30.0 | 71 | 1.93 | 0.8/2.5/3.4/4.2/10.0 |
| Ex 35 | Blend Of Ex 34 | 0.13 | 0.3 | 10 | 34.0 | 89 | 1.12 | 1.9/6.6/8.7/11.0/28.6 |
| Ex 36 | Blend Of Ex 34 | 0.13 | 0.3 | 15 | 26.8 | 55 | 0.82 | 1.7/6.0/10.8/20.0/49.5 |

Foams of density ranging from about 27 kg/m³ to about 34 kg/mr³ were successfully made from the blend of Example 34. Open cells could be varied from 55 to 89 vol percent. The cell sizes of the foams ranged from about 0.8 to about 1.1 mm. The Normalized Compressive Strengths (Total Compressive Strength/Density) of the foams of Example 35 and 36 were significantly greater than that of the reference foam (Comparative Example 19), even at lower foam density. These data indicate that foams made from the blends of this invention (Examples 34–36) exhibit significantly higher load bearing capability relative to foams made from LDPE alone, at similar densities and open cell contents. Or, foams made from the blends of this invention (Examples 34–36) will have equivalent load bearing capability to LDPE foams, but at comparatively lower foam density.

What is claimed is:
1. A blend which comprises;
A) a heterogeneous or homogenous linear ethylene homopolymer or interpolymer and
B) a branched homopolymer or interpolymer selected from the group consisting of LDPE, EVA, and EAA; and
wherein said blend has;
1) a melt index, I2, of about 0.05 to about 20 g/10 min;
2) a flexural modulus of $\geq 100{,}000$ psi;
3) a melt strength of $\geq 2$ cN;
4) a melt extensibility of $\geq 25$ mm/sec;
5) a UST greater than about 115° C.; and
6) wherein said melt strength of said blend meets the following inequality;

Melt strength $\geq F_{MS} * [(f*A) + ((1-f)*B)]$
where $A = 3.3814 * (I2)^{-0.6476}$ and $B = 16.882 * (I2)^{-0.6564}$; I2 is the measured melt index of the blend; f is the weight fraction of the linear component in the blend, and $F_{MS}$ is $\geq 1.1$.

2. The blend of claim 1 wherein
A) Component A has a melt index, I2, of less than about 60 g/10 min and is a heterogeneous or homogenous linear ethylene homopolymer, or a heterogeneous or homogenous linear interpolymer of ethylene with at least one $C_3$–$C_{20}$ α-olefin; and
B) Component B is selected from the group consisting of LDPE, EVA, and EAA; and
   wherein said blend has;
   1) a melt index, I2, of about 0.1 to about 10 g/10 min;
   2) a flexural modulus of $\geq 120,000$ psi;
   3) a melt strength of $\geq 7$ cN;
   4) a melt extensibility of $\geq 50$ mm/sec;
   5) a UST greater than about 118° C.; and
   6) FMS is $\geq 1.25$.

3. The blend of claim 1 wherein
A) Component A has a melt index, I2, of less than about 30 g/10 min and is a linear or substantially linear ethylene homopolymer or a linear or substantially linear ethylene/$C_3$–$C_8$ α-olefin interpolymer, and
B) Component B is LDPE;
   and wherein said blend has;
   1) a melt index, I2, of about 0.2 to about 7 g/10 min;
   2) a flexural modulus of $\geq 130,000$ psi
   3) a melt strength of $\geq 10$ cN;
   4) a melt extensibility of $\geq 75$ mm/sec;
   5) a UST greater than about 121° C.; and
   6) FMS is $\geq 1.5$.

4. The blend of claim 3 wherein Component A has a melt index, I2, of less than about 15 g/10 min, and wherein said blend has;
   1) a melt index, I2, of about 0.5 to about 5 g/10 min;
   2) a UST greater than about 125° C.; and
   3) $F_{MS}$ is $\geq 2.5$.

* * * * *